United States Patent [19]
Blair

[11] 4,336,944
[45] Jun. 29, 1982

[54] MECHANICAL-DYNAMIC ROTARY SEAL

[75] Inventor: W. Roscoe Blair, Charleston, S.C.

[73] Assignee: Raybestos-Manhattan, Inc., Trumbull, Conn.

[21] Appl. No.: 69,820

[22] Filed: Aug. 27, 1979

[51] Int. Cl.³ .............................................. F16J 15/34
[52] U.S. Cl. ................................. 277/81 R; 277/96.2
[58] Field of Search ........................... 277/96.1, 81 R

[56] References Cited

U.S. PATENT DOCUMENTS

| | | | |
|---|---|---|---|
| 3,101,200 | 8/1963 | Tracy | 277/81 R |
| 3,765,689 | 10/1973 | Adams | 277/81 R |
| 3,961,799 | 6/1976 | Peet | 277/81 R |

FOREIGN PATENT DOCUMENTS

| | | | |
|---|---|---|---|
| B30005 | 9/1955 | Fed. Rep. of Germany | 277/96.1 |
| 2626445 | 6/1975 | Fed. Rep. of Germany | 277/96.1 |

*Primary Examiner*—Robert I. Smith
*Attorney, Agent, or Firm*—Gary, Juettner & Pyle

[57] ABSTRACT

An improved seal for sealing a shaft in a stuffing box is characterized by a pair of annular seal elements positionable coaxially end to end around the shaft in the stuffing box. One of the elements is sealed and fixed around its inner periphery with the shaft, and the other is sealed and fixed around its outer periphery with the stuffing box. Abutting ends of the seal elements have complimentary configurations, and are movable together into closely mating, sealed and slidable engagement. Thus, upon relative rotation of the shaft and stuffing box the one element is stationary relative to the shaft and the other relative to the stuffing box, the abutting ends of the elements slide across each other in sealed engagement, and the elements seal the shaft in the stuffing box.

3 Claims, 7 Drawing Figures

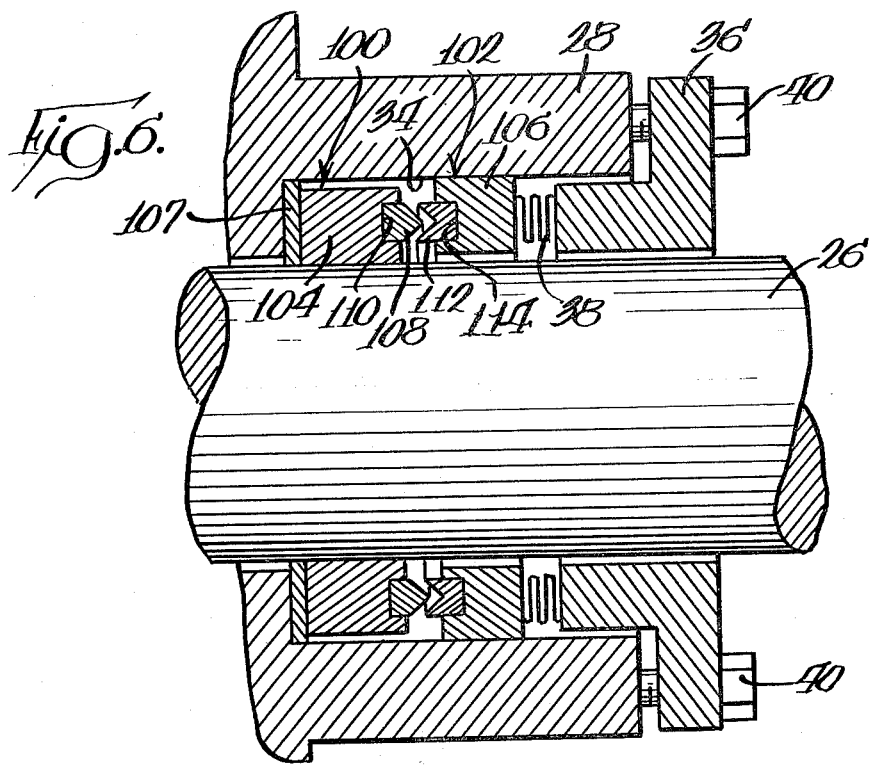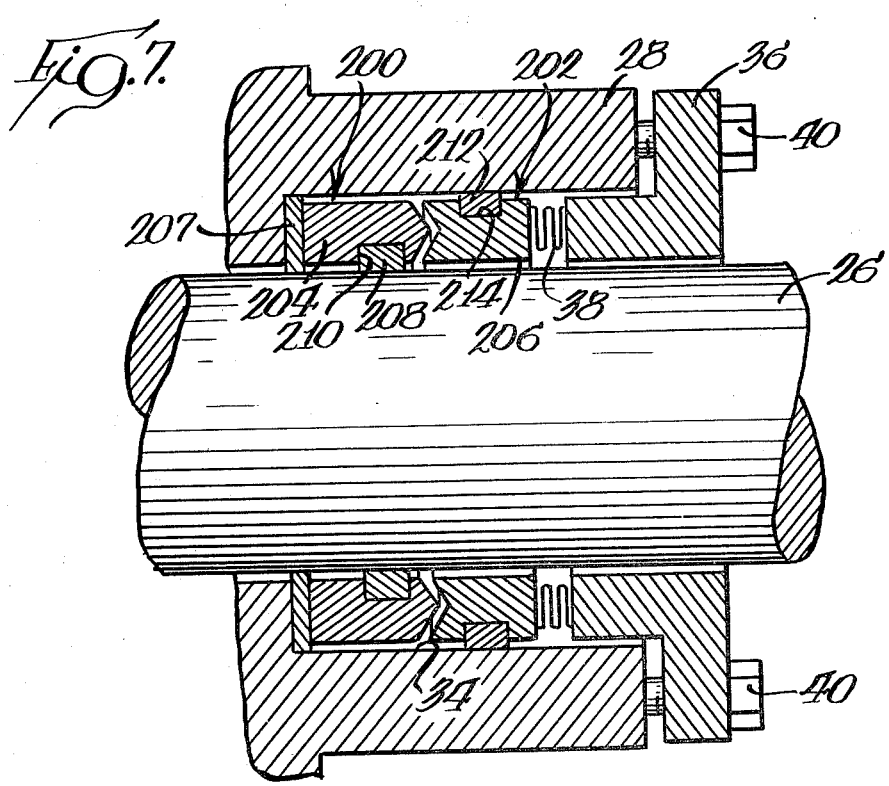

MECHANICAL-DYNAMIC ROTARY SEAL

BACKGROUND OF THE INVENTION

The present invention relates to mechanical seals of the type used for sealing a rotating shaft in a stuffing box.

Fluid seals for rotating shafts or the like may be of various types. In one type the sealing joint is formed by the rubbing juncture of two rigid materials, e.g., metal to metal or ceramics to graphite. In this case, the sealing surfaces must be machined, ground and lapped to very precise tolerances in order to obtain a fluid tight joint. Consequently, in manufacturing such seals to exacting requirements considerable labor is involved, and the seals are therefore very expensive and often impractical.

Another type of seal effects sealing by the rubbing contact of a flexible material, such as rubber, leather or the like, directly with a moving shaft or stuffing box surface. Although such seals are suitable for use under less exacting conditions, and are less expensive to manufacture than the aforementioned machined seals, as a result of friction when the flexible sealing material is rubbed against a dry surface the material may be subjected to heating, excessive wear, and loss of its sealing effect. Thus, in use the material must either be saturated with lubricant or lubricant otherwise supplied thereto, for example by seepage of the sealed off liquid.

OBJECTS OF THE INVENTION

The primary object of the present invention is to provide improved seals for rotary shafts and the like which are economical to manufacture and install.

SUMMARY OF THE INVENTION

In accordance with the present invention, a seal for sealing a shaft in a stuffing box comprises a pair of annular or cylindrical seal elements positionable coaxially end to end about the shaft within the stuffing box. One of the elements is sealed and fixed to the shaft about its inner periphery, and the other is sealed and fixed to a surface of the stuffing box about its outer periphery. Facing ends of the elements are formed in complimentary configurations and are movable together into mating, slidable and sealed engagement. In this manner, upon relative rotation of the shaft and stuffing box the one seal element is stationary relative to the shaft and the other relative to the stuffing box, and the elements rotate relative to each other with their facing ends in sealed, sliding engagement to seal the shaft in the stuffing box.

In one embodiment, the one element has a resilient material on its inner periphery and is of an inner diameter so that the material forms a tight and secure seal with the shaft, and the other element has a resilient material on its outer periphery and is of an outer diameter so that the material forms a tight and secure seal with the stuffing box, the resilient materials along with the mating seal faces of the elements substantially precluding movement of fluid around the shaft and through the stuffing box.

The elements are easily insertable around the shaft and in the stuffing box, and because they are in nonsliding contact therewith wear is minimized. Also, in consequence of the complimentary configured end faces of the elements a very high integrity seal is formed therebetween, and any wear of the end faces is automatically compensated for by continued movement of the same together. Thus, the seal requires very little maintenance and has an exceptionally long service life.

Other objects, advantages and features of the invention will become apparent from a consideration of the following detailed description, when taken in conjunction with the accompanying drawings.

BRIEF DESCRIPTION OF THE DRAWINGS

FIGS. 6 and 7 are side elevation views, partly in cross section, illustrating other embodiments of rotary seals in accordance with the invention.

DETAILED DESCRIPTION

The present invention provides universal rotary seals of economical construction for sealing rotating shafts in stuffing boxes to prevent the escape of fluid from the stuffing box or the entry of dirt or other foreign matter therein. By their novel structure the seals are free from sliding contact with the shaft and stuffing box, form a substantially fluid tight seal therebetween and require minimal adjustment in use, whereby wear of the seals is minimized and the same provide high integrity seals over very long service lives.

Figure 1:
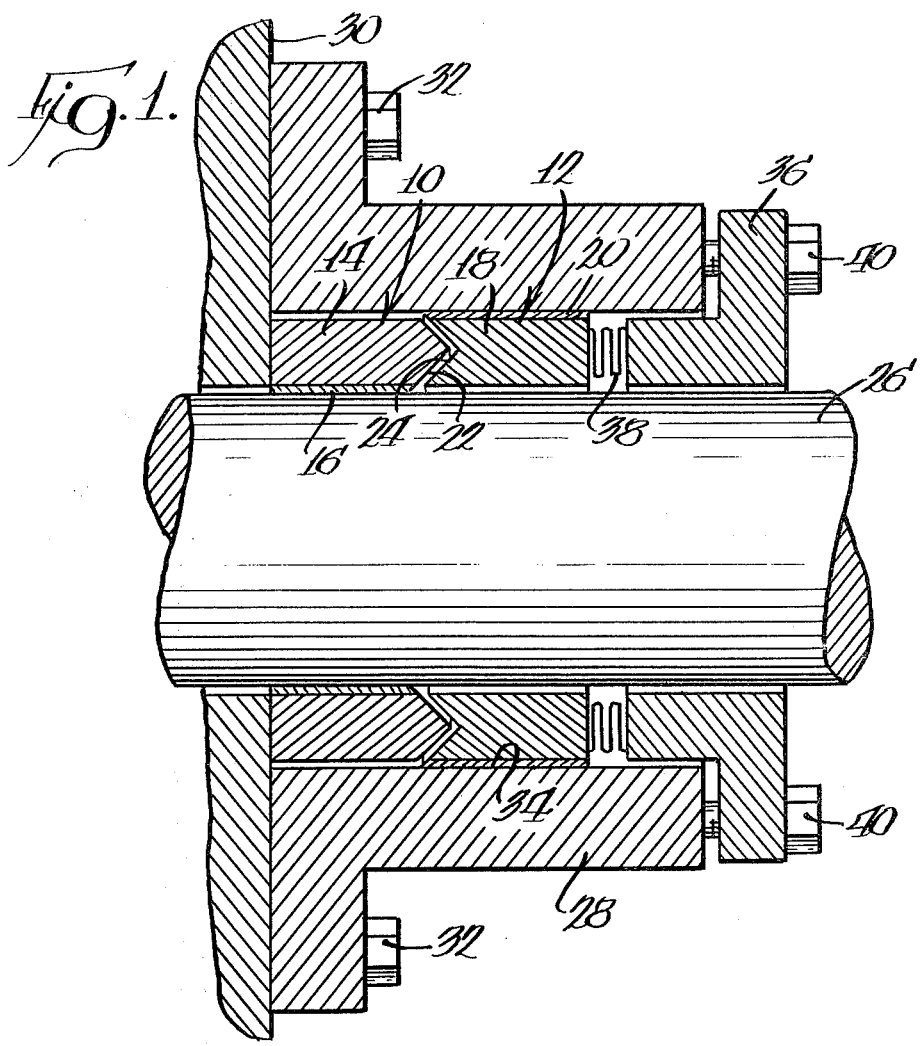
FIG. 1 is a side elevation view, partly in cross section, illustrating one embodiment of a rotary seal in accordance with the teachings of the present invention, showing the seal positioned between a relatively rotatable shaft and stuffing box.

Referring to FIG. 1, in accordance with one embodiment of the invention a seal comprises a pair of annular or cylindrical seal elements, indicated generally at 10 and 12, which are positionable coaxially end to end. The element 10 includes a body 14 of relatively rigid material and a layer or coating of a resilient material 16, such as rubber, on an inner peripheral surface of the body, and the element 12 has a body 18 of a relatively rigid material with a layer or coating of a resilient material 20 on its outer peripheral surface. Adjacent end faces 22 and 24 of the respective seal elements have complimentary configurations which may be planar or nonplanar and tortuous, for example complimentary V-shaped configurations as shown in FIG. 1, so that the ends may be moved together into mating engagement to form a secure, substantially fluid tight seal therebetween. To this end, to facilitate manufacture of the end faces, to advantageously enable some deformation of the same when moved together to enhance the seal therebetween, and to permit the end faces to slide across each other for a purpose to be described, the bodies 14 and 18, or at least the adjacent ends thereof, are peferably formed of a semiresilient, slippery material which may be conveniently manufactured to a desired configuration, such a material being compositions of Teflon, graphite, molybdenum disulfide, reinforcing fibers and the like.

In its illustrated use, the seal forms a fluid barrier between a rotatable shaft 26 and a housing or stuffing box 28 of conventional design. The shaft may, for example, comprise the output of a hydraulic motor having a motor casing 30, in which case the stuffing box is fastened and sealed to the casing by mounting bolts 32. The stuffing box has a center passage 34 through which the shaft extends, and the seal elements 10 and 12 are positionable around the shaft and within the passage.

Specifically, the seal element 10 is formed to have inner and outer diameters which are slightly less than the respective diameters of the shaft 26 and the passage 34. In this manner, and with a gland 36, the purpose of which will hereinafter be described, removed from an outer end of the stuffing box, the element may conveniently be positioned about the shaft and moved to its illustrated position in the stuffing box, whereat the resilient material 16 forms a tight, high integrity fluid seal between element and the shaft and secures the element to the shaft for rotation therewith.

In somewhat similar fashion the seal element 12 has inner and outer diameters which are slightly greater than the respective diameters of the shaft and stuffing box passage 34. Thus, after placement of the element 10 on the shaft, to complete the assembly of the seal the element 12 may simply be positioned around the shaft and moved into the passage 34 to abut the end faces of the elements, whereat the resilient material 20 forms a tight, high integrity fluid seal between the element and the stuffing box wall and fixes the element thereto. Thus, upon rotation of the shaft the seal element 10 rotates therewith and out of contact with the stuffing box, the shaft rotates within but out of contact with the seal element 12, and the mating end faces 22 and 24 of the elements slide across each other in sealed engagement. To this end, to enhance the seal between the end faces a tensioning spring 38 may be maintained under compression between the gland 36 and an outer end of the element 12 to provide dynamic compensation over the force moving the elements together, and bolts 40 on the gland are adjustable to tension the spring and compensate for wear.

The integrity of the seal may be appreciated by considering the path that would be traveled by fluid attempting to exit from the casing 30. The fluid would be free to travel around the outer, but not the inner periphery of the seal element 10 to the abutting faces 22 and 24 of the elements, but would then be substantially blocked from further travel both by the seal formed with the stuffing box by the resilient material 20 of the element 12 and by the sliding seal between the end faces, except for a relatively minute amount of fluid which may be permitted to seep between the end faces to lubricate the same and enhance the seal formed thereby. Similarly, dirt or other external foreign matter would be able to travel around the inner, but not the outer, periphery of the element 12 to the abutting end faces, but would then be inhibited from passage therepast by the sliding seal between the end faces and the seal formed with the shaft by the resilient material 16 on the element 10.

It is to be appreciated that in addition to securely sealing the shaft in the stuffing box, the novel structure of the seal results in a considerably extended life thereof. Except for the end faces 22 and 24, which slide across each other, there are no other portions of the seal subject to frictional wear, and any wear of the end faces is automatically compensated for by the spring 38 which maintains the faces in sealed engagement. Thus, except possibly for periodic retightening the bolts 40 to compensate for the slight wear that will ultimately be experienced by the relatively slippery dynamic sealing end faces, the seal requires very little servicing and is quite trouble free.

Figure 2:
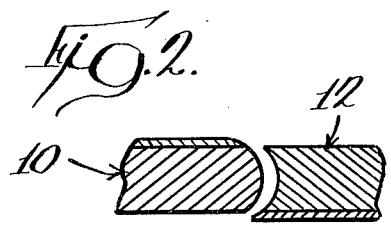
FIGS. 2-5 illustrate some of the various possible configurations for opposing end faces of the seal in accordance with other embodiments of the invention.
Figure 3:
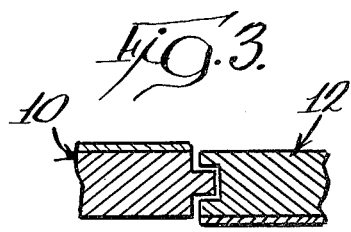
Figure 4:
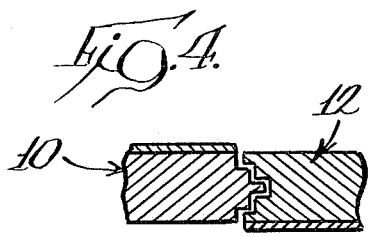
Figure 5:
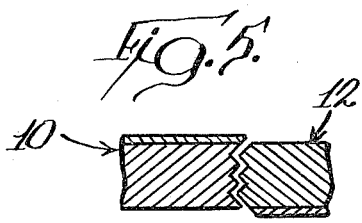

FIGS. 2–5 illustrate other possible configurations for the end faces of the seal elements. In FIG. 2, for example, the end faces are curved, in FIG. 3 dovetailed, in FIG. 4 stepped, and in FIG. 5 they have a sawtooth configuration. The illustrated configurations, of course, are not intended to be exhaustive, but have been included merely to show some of the many possible formations of the end faces, the primary requirement being that the same have complimentary configurations in order to enhance the integrity of a fluid seal formed therebetween.

FIGS. 6 and 7 illustrate alternative embodiments of universal rotary seals constructed in accordance with the teachings of the invention, wherein like reference numerals denote like elements. Referring to FIG. 6, the seal illustrated includes a pair of annular or cylindrical seal elements, indicated generally at 100 and 102, positionable coaxially end to end. The seal element 100 includes an integral cylindrical body 104 of relatively rigid yet flexible material which abuts against a slip ring 107 and has inner and outer diameters which are slightly less than the respective diameters of the shaft 26 and stuffing box passing 34, whereby the body may be extended about and sealingly mounted on the shaft without the need for a separate sealing material on it inner periphery. Similarly, the element 102 has a cylindrical body 106 of relatively rigid yet flexible material having inner and outer diameters which are slightly greater than the respective diameters of the shaft and passage, whereby the body may be extended into and sealingly mounted against the stuffing box without need for a separate sealing material on its outer periphery.

To seal between adjacent facing ends of the elements 100 and 102, an annular end face insert 108 is mounted and sealed within a recess 110 in the end of the body 104 and an annular end face insert 112 is mounted and sealed within a recess 114 in the end of the body 106. The end face inserts have complimentary configurations, for example the V-shaped configurations shown, and are movable together into mating, tightly sealed and sliding engagement, whereby the seal elements 100 and 102 form a high integrity seal between the shaft and stuffing box.

The embodiment of rotary seal shown in FIG. 6 offers certain advantages over that in FIG. 1. For example, the construction of the main body portions of the seal elements is simplified, since the same are not required to carry separate sealing materials on their respective inner and outer peripheries. In addition, since primary wear occurs between the sliding end faces of the elements, upon the end faces wearing to a point requiring replacement it is not necessary to replace the entirety of the seal. Simply, the end face inserts 110 and 112 alone are replaced. Further, by virtue of the decreased area of contact afforded by the inserts, a greater pressure per unit of area may be maintained on the engaging surfaces of the inserts to enhance the seal therebetween.

In the embodiment shown in FIG. 7 the rotary seal also comprises a pair of annular or cylindrical seal elements, indicated generally at 200 and 202, which are positionable coaxially end to end. The seal elements include respective integral bodies 204 and 206 of a relatively rigid material, with the body 204 abutting against a slip ring 207, and in this case each body has outer and inner diameters which are slightly greater and slightly less than the respective diameters of the shaft 26 and stuffing box passage 34. To sealingly mount the element 200 on the shaft for rotation therewith, an inner annular ring 208, having an inner diameter slightly less than the diameter of the shaft, is sealingly received within an annular recess 210 in the inner periphery of the body 204. In a similar fashion, to sealingly mount the element 202 in the stuffing box, an outer annular ring 212, having an outer diameter slightly greater than that of the passage 34, is sealingly received within an annular recess 214 in the outer periphery of the body 206. An end seal between the elements 200 and 202 is provided by the facing ends of the bodies 204 and 206 which are complimentary in configuration. An advantage of the rotary seal of FIG. 7 over that in FIG. 1 is that the inner and outer rings 208 and 212 seal against smaller areas of the shaft and stuffing box than do the corresponding resilient materials 16 and 20, so that greater pressures may be obtained per unit of area to enhance the seals formed thereby.

It is understood, of course, that any suitable material, for example compositions of Teflon, graphite, molybdenum disulfide and reinforcing fibers may be used in construction of the seal elements shown in FIGS. 6 and 7, and that the body portions and end face inserts of the seal elements in FIG. 6, along with the body portions and the inner and outer rings of the seal elements illustrated in FIG. 7, may be formed of the same or different materials.

While embodiments of the invention have been described in detail, various modifications and other embodiments thereof may be devised by one skilled in the art without departing from the spirit and the scope of the invention, as defined by the appended claims.

What is claimed is:

1. In combination, a stuffing box having a passage therethrough, a shaft extending through said stuffing box passage and rotatable therein, and a seal for sealing said shaft in said stuffing box passage, said seal consisting essentially of a pair of annular seal elements positioned coaxially end to end around said shaft and in said stuffing box passage, one of said elements being sealingly mounted about its inner periphery to said shaft and the other of said elements being sealingly mounted about its outer periphery to said stuffing box, adjacent ends of said elements having complementary configured end faces which are moved together into closely mating, sliding and sealed engagement, whereby in use upon relative rotation of said stuffing box and said shaft said one element is stationary relative to said shaft, said other element is stationary relative to said stuffing box, and said end faces are in mating, sealed and sliding engagement and seal said shaft in said stuffing box, and further including adjustable means for urging said end faces together into sliding, sealed and mating engagement with a controllable force to compensate for wear of said end faces and to maintain a secure, leak proof seal therebetween, said adjustable means comprising a gland, means for mounting said gland on said stuffing box about said stuffing box passage for movement toward and away from said stuffing box, said mounting means including external adjustment means operable to move said gland toward or away from said stuffing box, and spring means extending in said stuffing box passage between said gland and the adjacent one of said seal elements for urging said seal element end faces together, whereby operation of said external adjustment means moves said gland toward or away from said stuffing box to increase or decrease the force with which said spring means urges said seal element end faces together.

2. A seal as in claim 1, said end face on each said element comprising a ring-like seal sealingly mounted on said adjacent end of said element, facing surfaces of said ring-like seals having complimentary configurations for movement into mating, sealed and sliding engagement.

3. A seal as in claim 1, said end faces being planar.

* * * * *